United States Patent
Switzer et al.

(10) Patent No.: US 11,976,758 B1
(45) Date of Patent: May 7, 2024

(54) ELECTRICALLY INSULATED THREADED CONNECTION

(71) Applicant: QUANTUM ENERGY TECHNOLOGIES LLC, Houston, TX (US)

(72) Inventors: David A. Switzer, Calgary (CA); Tony Dopf, Bragg Creek (CA); Danick R. J. Normandeau, Calgary (CA); Kyle W. Twynam, Calgary (CA)

(73) Assignee: QUANTUM ENERGY TECHNOLOGIES LLC, Houston, TX (US)

( * ) Notice: Subject to any disclaimer, the term of this patent is extended or adjusted under 35 U.S.C. 154(b) by 0 days.

(21) Appl. No.: 18/523,842

(22) Filed: Nov. 29, 2023

Related U.S. Application Data

(63) Continuation of application No. 18/500,451, filed on Nov. 2, 2023.
(60) Provisional application No. 63/431,270, filed on Dec. 8, 2022.

(51) Int. Cl.
*H01B 17/38* (2006.01)
*F16L 25/02* (2006.01)
*H01B 17/58* (2006.01)

(52) U.S. Cl.
CPC .......... *F16L 25/021* (2013.01); *H01B 17/38* (2013.01); *H01B 17/58* (2013.01)

(58) Field of Classification Search
CPC ........ H01B 17/38; H01B 17/58; H01B 17/30; H01B 17/301; H01B 17/583; F16L 25/021; F16L 25/02; F16L 25/00
USPC .......... 174/85, 68.1, 70 R, 84 R, 70 C, 96, 174/137 R, 138 R, 152 R; 138/111, 112, 138/118.1, 155; 285/80, 149.1, 222.1, 285/222.2

See application file for complete search history.

(56) References Cited

U.S. PATENT DOCUMENTS

| | | | | |
|---|---|---|---|---|
| 3,687,493 A | * | 8/1972 | Lock | F16L 15/003 411/548 |
| 4,674,773 A | * | 6/1987 | Stone | F16B 33/00 285/333 |
| 5,138,313 A | * | 8/1992 | Barrington | E21B 17/003 175/40 |
| 5,406,983 A | * | 4/1995 | Chambers | F16L 9/14 138/143 |
| 5,749,605 A | * | 5/1998 | Hampton, III | F16L 25/021 285/333 |

(Continued)

*Primary Examiner* — Angel R Estrada
(74) *Attorney, Agent, or Firm* — Basil M. Angelo; ANGELO IP

(57) ABSTRACT

An electrical insulated threaded connection includes a conductive box with a plurality of internal threads, a conductive pin with a plurality of external threads, and a double-threaded electrical insulator sleeve disposed between the conductive pin and box. The double-threaded electrical insulator sleeve comprises a plurality of external threads that mate with the plurality of internal threads of the conductive box and a plurality of internal threads that mate with the plurality of external threads of the conductive pin. In certain embodiments, the double-threaded electrical insulator sleeve fills a full volume between the plurality of internal threads of the conductive box and the plurality of external threads of the conductive pin, and there are no voids or pockets between any of the mating threads.

27 Claims, 16 Drawing Sheets

(56) References Cited

U.S. PATENT DOCUMENTS

| | | | |
|---|---|---|---|
| 6,050,353 A | 4/2000 | Logan et al. | |
| 7,255,183 B2 | 8/2007 | Cramer | |
| 7,326,015 B2 * | 2/2008 | Reynolds, Jr. | F16L 25/021 |
| | | | 411/914 |
| 7,387,167 B2 | 6/2008 | Fraser et al. | |
| 7,900,968 B2 | 3/2011 | Camwell et al. | |
| 9,677,179 B2 * | 6/2017 | Kriesels | C23C 24/106 |
| 10,156,102 B2 | 12/2018 | Derkacz et al. | |
| 10,246,947 B2 * | 4/2019 | Danov | F16B 7/18 |

\* cited by examiner

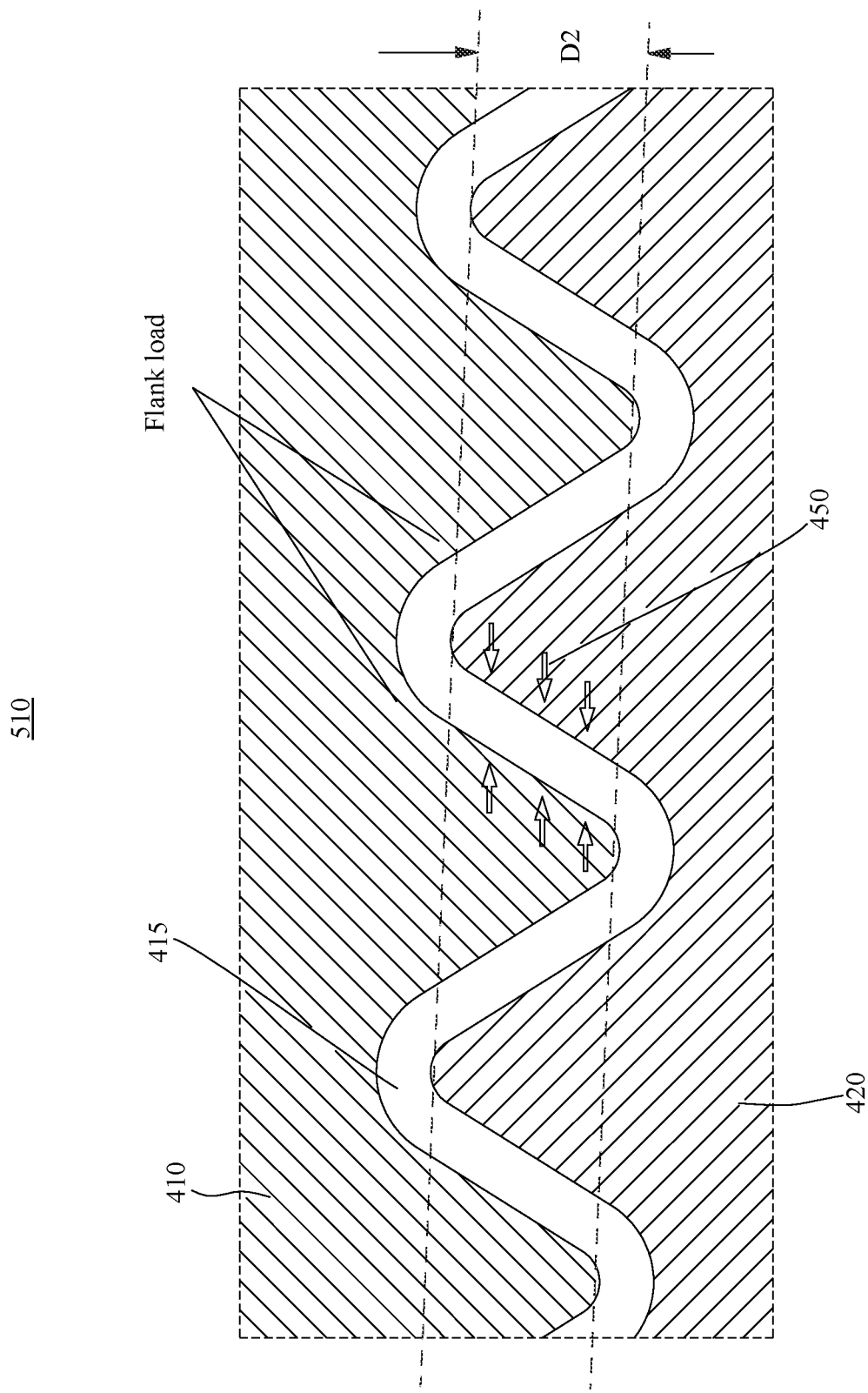

ELECTRICALLY INSULATED THREADED CONNECTION

CROSS-REFERENCE TO RELATED APPLICATIONS

This application is a continuation of U.S. patent application Ser. No. 18/500,451, filed on Nov. 2, 2023, which claims the benefit of, or priority to, U.S. Provisional Patent Application Ser. No. 63/431,270, filed on Dec. 8, 2022, both of which are hereby incorporated by reference in their entirety for all purposes.

BACKGROUND OF THE INVENTION

In oil and gas exploration, measurement while drilling ("MWD") refers to the use of downhole data and measurements to assist in the steering and control of a drilling operation. MWD systems use sensors and measurement tools that are typically disposed in the bottom hole assembly ("BHA") near to the drill bit, but above the direct steering elements such as, for example, the bent mud motor or rotary steerable assembly. A communication link provides real-time telemetry between the MWD system disposed downhole and the surface. The most common telemetry methods include mud pulse ("MP") telemetry and electromagnetic ("EM") telemetry.

EM telemetry includes the generation of EM waves downhole that travel through the earth and are detected on the surface. EM communications are typically electric field-based with a voltage applied across a non-conductive gap of a gap sub. A gap sub is a tubular member of the drill string that creates a non-conductive gap that electrically isolates portions of the drill string above and below the non-conductive gap. While EM telemetry provides several advantages over MP telemetry, including faster transmission rates, the ability to operate independent of mud flow or the properties of the mud, increased reliability due to no moving parts downhole, and bi-directional communication capabilities, MP telemetry remains the most commonly used telemetry method due to the cost and complexity of EM telemetry.

An EM telemetry system is typically packaged in a small diameter probe that is positioned within a drill collar and centered along the axis of the gap sub. As noted above, the gap sub partitions the drill string into two conductive portions that are electrically isolated from one another by the non-conductive gap of the gap sub. The probe makes independent electrical contact with each of the two conductive portions. When the probe modulates a voltage across the non-conductive gap, the two conductive portions serve as a dipole antenna that generates an EM wave that propagates through the earth to the surface. EM waves are detected on the surface by measuring the electrical potential difference between the drill string or a metal casing that extends into the ground and one or more ground rods or conductive stakes that are buried in the ground at some distance from the drilling equipment.

SUMMARY OF THE INVENTION

According to one aspect of one or more embodiments of the present invention, an electrically insulated threaded connection includes a conductive box with a plurality of internal threads, a conductive pin with a plurality of external threads, and a double-threaded electrical insulator sleeve disposed between the conductive pin and box. The double-threaded electrical insulator sleeve includes a plurality of external threads that mate with the plurality of internal threads of the conductive box and a plurality of internal threads that mate with the plurality of external threads of the conductive pin. The double-threaded electrical insulator sleeve fills a full volume between the plurality of internal threads of the conductive box and the plurality of external threads of the conductive pin, and there are no voids or pockets between any of the mating threads.

According to one aspect of one or more embodiments of the present invention, an electrically insulated threaded connection includes a conductive box with a plurality of internal threads, a conductive pin with a plurality of external threads, and a double-threaded electrical insulator sleeve disposed between the conductive pin and box. The double-threaded electrical insulator sleeve includes a plurality of external threads that mate with the plurality of internal threads of the conductive box and a plurality of internal threads that mate with the plurality of external threads of the conductive pin. The plurality of external threads of the double-threaded electrical insulator sleeve starts to interfere with the plurality of internal threads of the conductive box before corresponding shoulders of the conductive pin and the conductive box make contact.

According to one aspect of one or more embodiments of the present invention, a double-threaded electrical insulator sleeve includes a plurality of external threads having a thread form that mates with a plurality of internal threads of a conductive box, and a plurality of internal threads having a thread form that mates with a plurality of external threads of a conductive pin. The double-threaded electrical insulator sleeve is disposed between the conductive pin and box. The double-threaded electrical insulator sleeve fills a full volume between the plurality of internal threads of the conductive box and the plurality of external threads of the conductive pin, and wherein there are no voids or pockets between any of the mating threads.

Other aspects of the present invention will be apparent from the following description and claims.

BRIEF DESCRIPTION OF DRAWINGS

FIG. 5B shows a cross-sectional detail view of the exemplary electrically insulated threaded connection with double-threaded electrical insulator sleeve showing improved interleaving in accordance with one or more embodiments of the present invention.

DETAILED DESCRIPTION OF THE INVENTION

Figure 1:
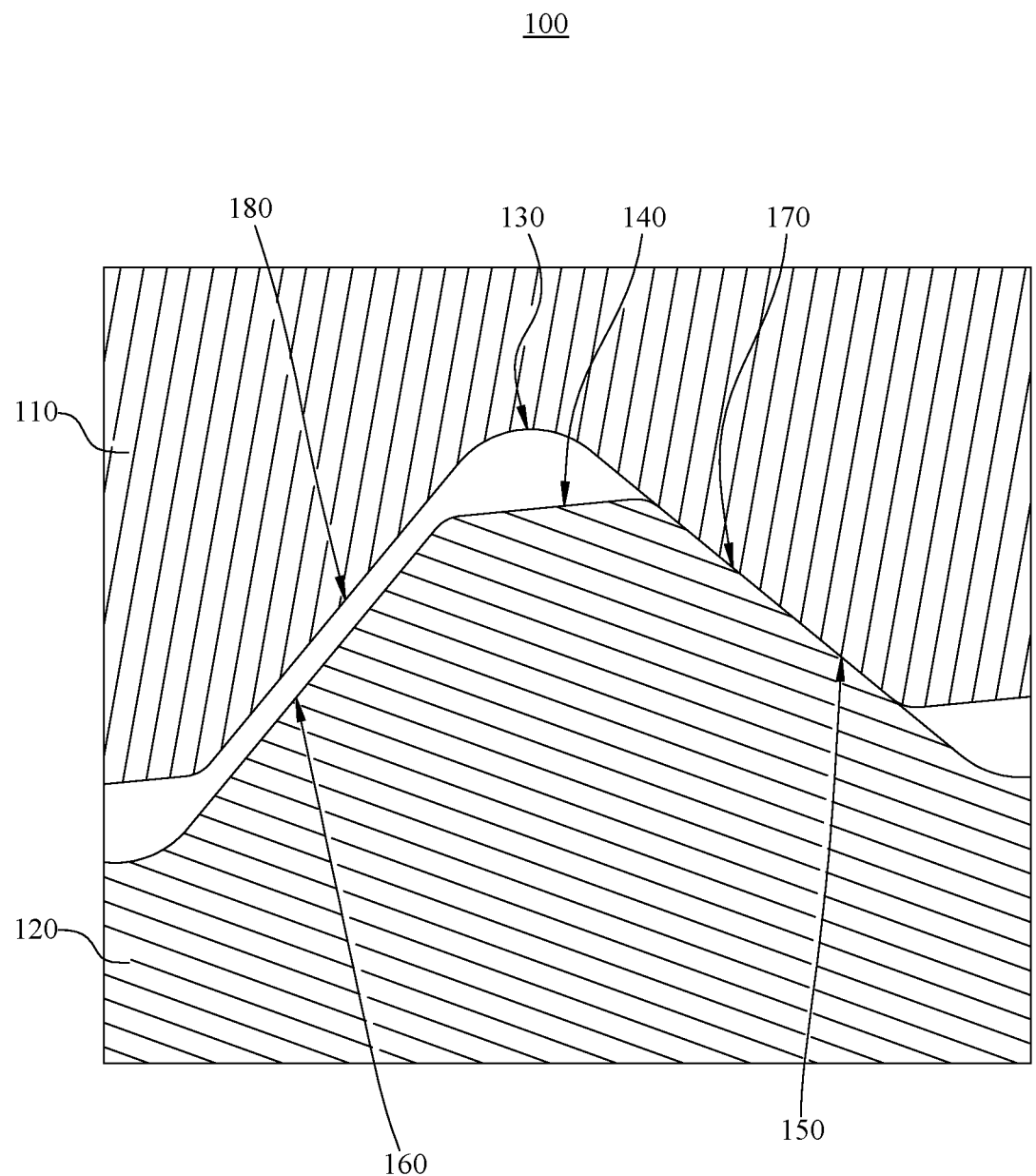
FIG. 1 shows a cross-sectional detail view of a portion of a conventional thread in a metal-to-metal mating configuration.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

For the purposes of this disclosure, thread means an adjacent root and crest. Thread form refers to mating threads that have one or more features that define their engagement. Threaded connection means a mating pin and box each comprising a plurality of threads. Pin refers to the externally threaded portion of the threaded connection and box refers to the internally threaded portion of the threaded connection. Thread tooth means the protruding portion of a thread that defines the crest of a thread and engages with a thread groove. The crest refers to the top portion of a thread tooth. Thread groove means the valley formed between adjacent thread teeth that defines the root of the thread and engages with a thread tooth. The root refers to the bottom portion of the valley.

Conventional threaded connections used in the oil and gas industry include flush joints where the outer diameter of adjacent tubular members is substantially the same. In other words, an internal threaded connection, within the wall thickness of the tubular members themselves, joins the tubular members together. The tubular member that is internally threaded is referred to as the box and the tubular member that is externally threaded is referred to as the pin. The pin is inserted into the box to make the threaded connection, such that the outer diameter is flush.

FIG. 1 shows a cross-sectional detail view of a portion of a conventional thread 100 in a metal-to-metal mating configuration. This conventional thread form may be defined in part by root 130, crest 140, pin load flank 150, pin stab flank 160, box load flank 170, and box stab flank 180. The distal end of pin 120 of one tubular member (not independently illustrated) is inserted into box 110 of the other tubular member (not independently illustrated). Pin load flank 150 comes to rest on box load flank 170, while pin stab flank 160 and box stab flank 180 purposefully include sufficient clearance to allow thread 100 engagement as pin 120 is rotated into box 110 towards the final fully engaged, or made-up, position of the threaded connection. The metal-on-metal mating surfaces typically halt forward progress of the threaded connection and contact tends to shift from stab flanks 160 and 180 to load flanks 150 and 170. Make-up typically occurs when the tubular members are driven together by applied torque that rotates pin 120 within box 110, forcing pin stab flank 160 to move away from box stab flank 180, resulting in a gap, sometimes referred to as a void or a pocket. Because of the metal-to-metal contact between box 110 and pin 120, their respective tubular members (not independently shown), are electrically coupled and conductive.

To function as, for example, a gap sub, there must be electrical isolation between constituent tubular members of the gap sub, that are typically composed of stainless steel and are conductive. Conventional attempts to provide electrical isolation have applied dielectric coatings (e.g., a ceramic coating) to the threads themselves or disposed a dielectric material (e.g., an epoxy-filled gap) in the gap between threads. However, the use of dielectric coatings and materials has proven problematic as they tend to be brittle or fail mechanically under load. Other conventional attempts have placed an electrical insulator material between the pin and box of standard oilfield thread forms. These thread forms include American Petroleum Institute ("API") V-038R, V-040, V-050, and other thread forms. The electrical insulator material is typically positioned between these standard thread forms and is compressed on the load flanks of the threads.

Figure 2:
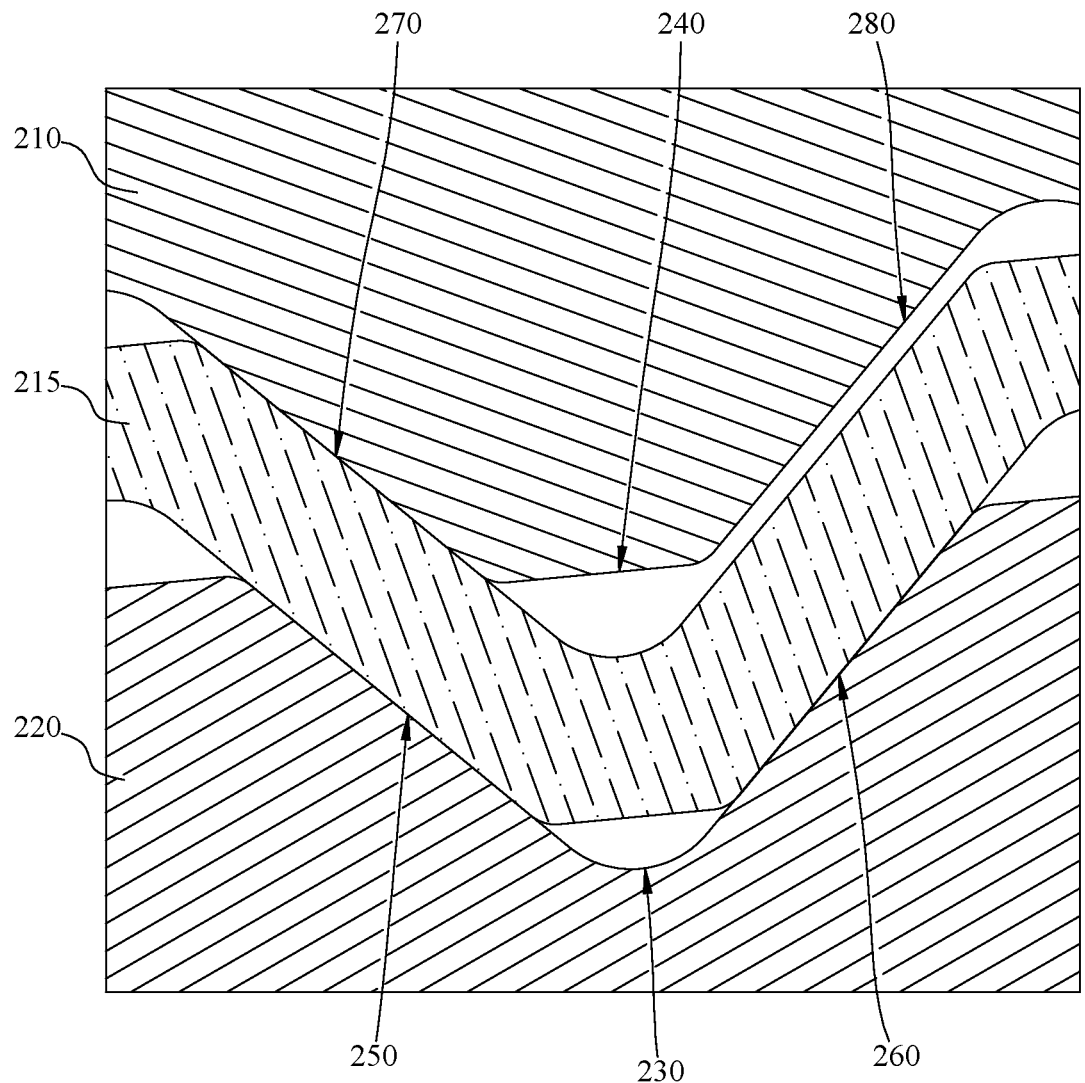
FIG. 2 shows a cross-sectional detail view of a portion of a conventional thread with an electrical insulator disposed between the conductive pin and the conductive box.

FIG. 2 shows a cross-sectional detail view of a portion of a conventional thread 200 with an electrical insulator 215 disposed between box 210 and pin 220. This conventional thread form may be defined in part by root 230, crest 240, pin load flank 250, pin stab flank 260, box load flank 270, and box stab flank 280. However, the disposition of electrical insulator 215 between this standard thread form substantially changes the nature of the engagement of thread 200. To provide for consistent thread engagement and slide contact until shouldering, standard thread forms intentionally include clearance gaps in the mating pitch lines as well as voids, or pockets, at the roots and crests. Placing electrical insulator 215 in between the thread forms exacerbates this and increases the clearance between the mating pitch lines of the metal sections and reduces the load flank 250, 270 contact further. In most conventional designs, less than 20% of electrical insulator 215 is loaded, therefore the loaded areas are subject to extremely high stress and prone to mechanical failure. While electrical insulator 215 is typically composed of rubber, plastic, epoxy, or ceramic, the use of rubber, plastic, and epoxy is typically not encouraged because they are significantly weaker than the metal portions of box 210 and pin 220 and typically cannot withstand the stress in the load flank area. Ceramics and ceramic coatings are typically too brittle for use in the threaded geometry and tend to mechanically fail during make-up or operative use. As such, conventional attempts have focused on lower loading or the use of aggressive adhesives, such as, for example, Baker Hughes® Bakerlok® thread locking compound, to add resistive torque to the joint strength. Notwithstanding, these conventional attempts are prone to failure and in the case of gap subs, failure typically results in the loss of EM communications, such that operations must be suspended, and time consuming and expensive operations must be conducted to pull, repair, or replace the defective gap sub to re-establish downhole communications.

Figure 3A:
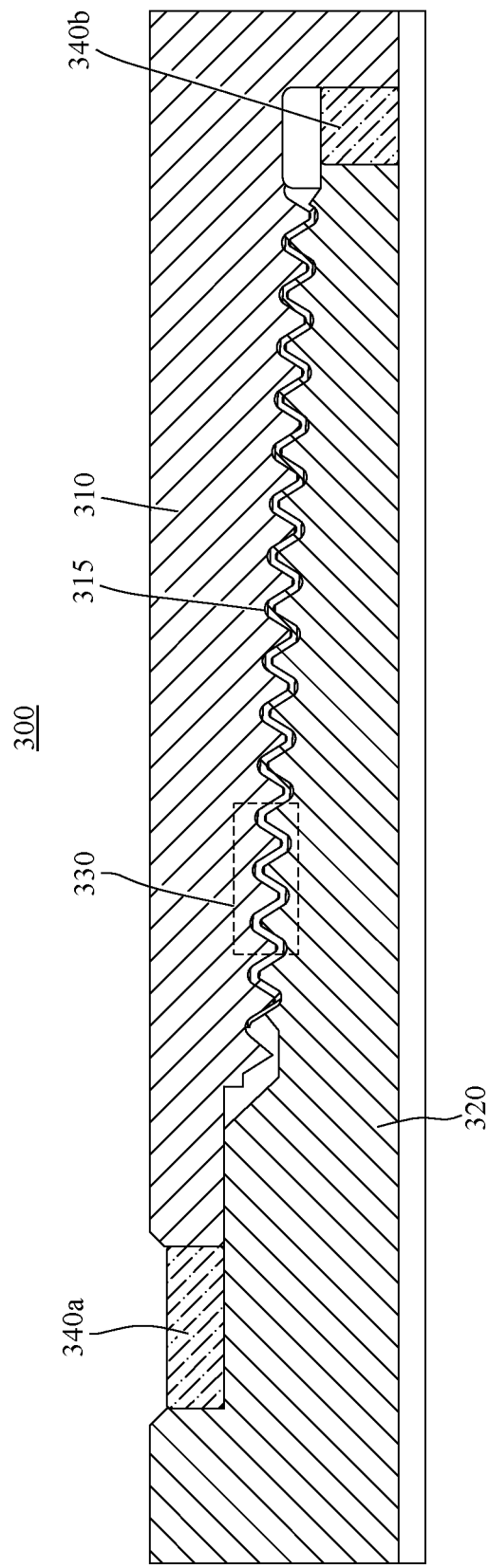
FIG. 3A shows a cross-sectional view of a conventional threaded connection with an electrical insulator disposed between the metal threads in a double-shouldered configuration.

FIG. 3A shows a cross-sectional view of a conventional threaded connection 300 with an electrical insulator material 315 disposed between the metal threads in a double-shouldered 340a, 340b configuration. Threaded connection 300 includes a conductive box 310 and a conductive pin 320 comprising a standard API thread form with an electrical insulator material 315 disposed between conductive box 310 and conductive pin 320. In the example depicted, conductive pin 320 is fully engaged, or made-up, when conductive box 310 makes contact with non-conductive shoulder 340a and conductive pin 320 makes contact with non-conductive shoulder 340b, such that no further engagement is possible.

Figure 3B:
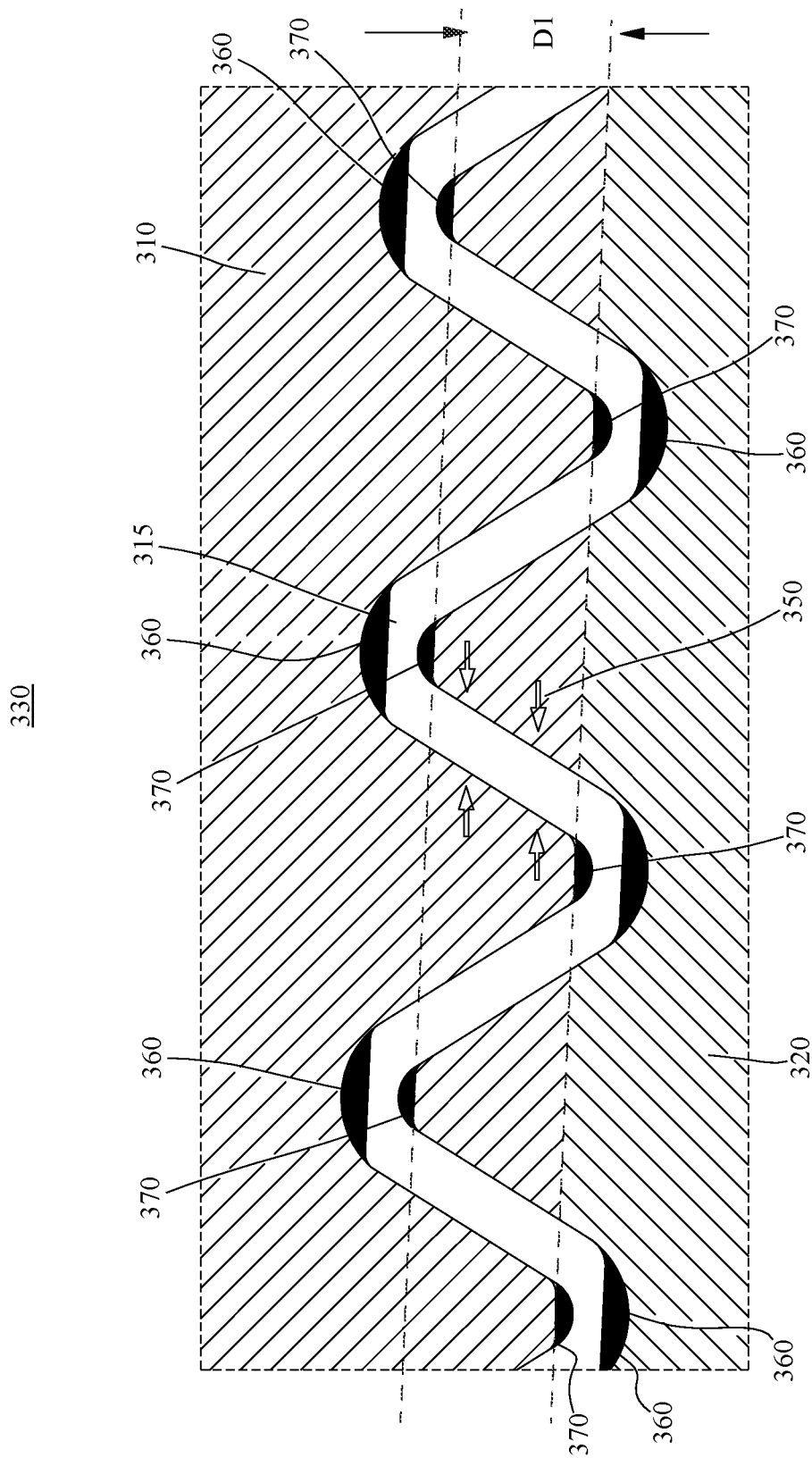
FIG. 3B shows a cross-sectional detail view of the conventional threaded connection with the electrical insulator disposed between the metal threads in the double-shouldered configuration.

Continuing, FIG. 3B shows a cross-sectional detail view 330 of a conventional threaded connection 300 with an electrical insulator 315 disposed between the metal threads. While the flank loads (e.g., 350) are induced by make-up torque, the standard API thread form with electrical insulator 315 disposed between conductive box 310 and conductive pin 320 results in limited interleaving height, D1. The load is transmitted between adjacent thread flanks (e.g., 350) through electrical insulator 315. Only those portions of the threads that are interleaved, D1, will effectively transmit the load. The interleaved height is conventionally used as a measure of flank engagement and load capacity. Here, the voids and pockets 360, 370 between mating threads reduce the interleaved height and load capacity.

Conventional electrically insulated threaded connections, including those that use electrical insulators, suffer from one or more of increased design complexity, increased costs to manufacture, increased costs to maintain, insufficient make-up torque capability, difficult break-out torque requirement, and poor or failed electrical insulation. For these reasons, conventional gap subs and conventional electrically insulated threaded connections have traditionally been the weak link of a drill string. Thus, there is a long felt but unsolved need in the industry for an electrically insulated threaded connection that provides increased make-up torque capability, a robust threaded connection that maintains structural integrity, and is comparatively inexpensive to manufacture or maintain.

Accordingly, in one or more embodiments of the present invention, an electrically insulated threaded connection provides a robust threaded connection that provides electrical isolation, maintains structural integrity, and provides increased torque capability. The threaded connection may include three components, a conductive pin with a plurality of external threads, a conductive box with a plurality of internal threads, and a double-threaded electrical insulator sleeve that includes a plurality of external threads that mate with the plurality of internal threads of the conductive box and a plurality of internal threads that mate with the plurality of external threads of the conductive pin. In certain embodiments, the insulated sleeve fills the entire volume between the metal threads of the conductive pin and the conductive box such that there are no voids or pockets between the metal threads and the electrical insulator sleeve. As such, there is nowhere for the electrical insulator sleeve to deform into under load (via the Poisson effect). The contact pressures on all faces of the electrical insulator sleeve, and its resistance to changing volume, imparts pressure loading on the conductive pin and the conductive box that causes radial displacement of both bodies, which further increases the torque on the joint. The substantially even distribution of stress in the threaded connection increases both make-up and break-out torque capability. In addition, the threaded connection provides additional interference between the plurality of external threads of the electrical insulator sleeve and the mating plurality of internal threads of the conductive box and between the plurality of internal threads of the electrical insulator sleeve and the mating plurality of external threads of the conductive pin. In certain embodiments, the threads start to interfere before the corresponding shoulders, if any, of the conductive pin and the conductive box contact each other. Advantageously, the threaded connection provides substantially higher torsional strength. The added interference between the insulator sleeve and mating conductive parts provides additional make-up torque due to the load on the shoulders, if any, and the radial interference between threads. This makes the threaded connection substantially stronger, and more torque may be applied without damaging the insulator sleeve.

Figure 4:
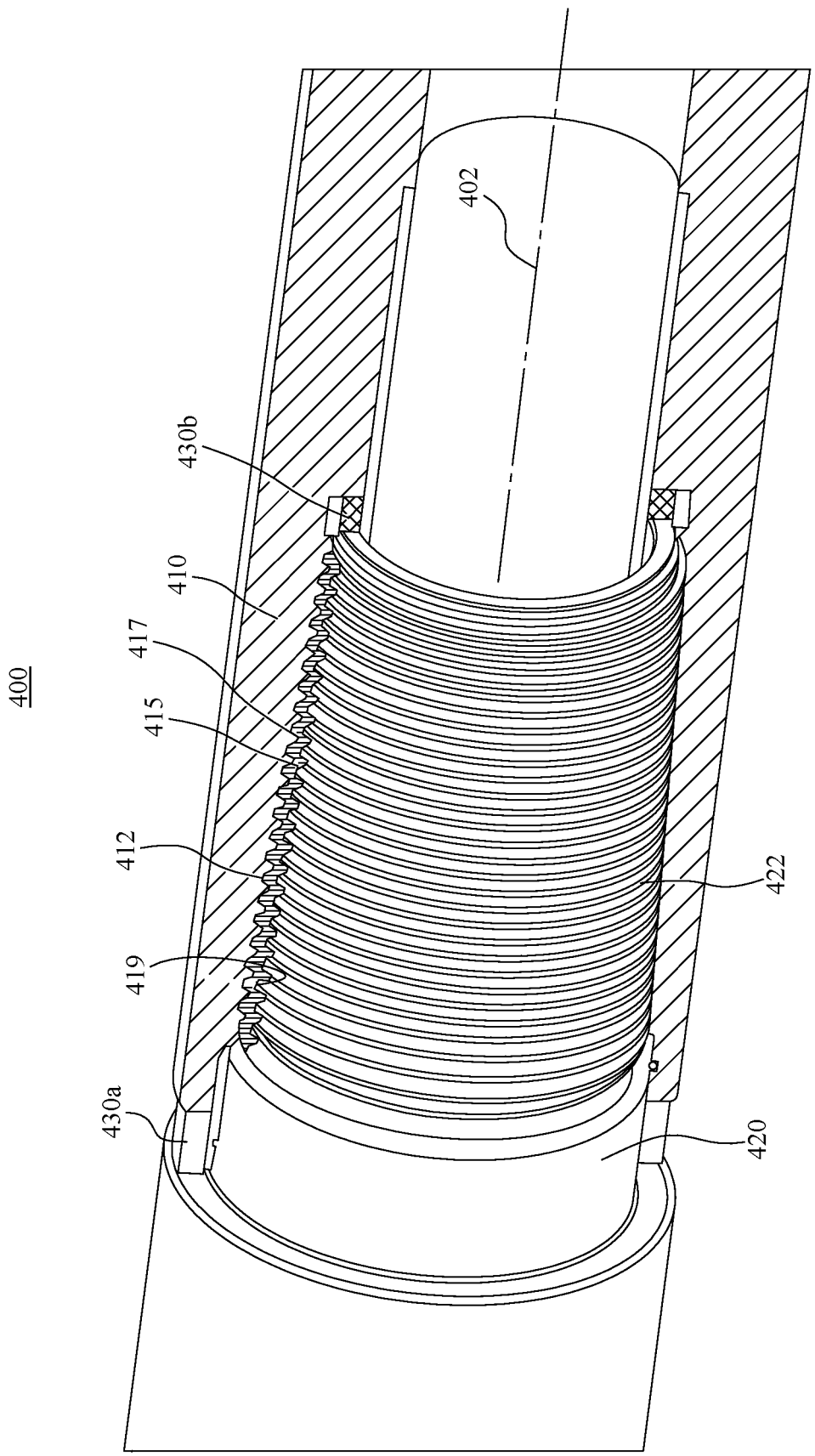
FIG. 4 shows a hybrid-cross-sectional detail view of an electrically insulated threaded connection with a double-threaded electrical insulator sleeve in accordance with one or more embodiments of the present invention.

FIG. 4 shows a hybrid-cross-sectional detail view of an exemplary electrically insulated threaded connection 400 with a double-threaded electrical insulator sleeve 415 in accordance with one or more embodiments of the present invention. One of ordinary skill in the art, having the benefit of this disclosure, will realize that other types of threaded connections, including the use of different thread forms, may be used in accordance with one or more embodiment of the present invention and electrically insulated threaded connection 400 is an exemplary embodiment for purposes of illustration.

An electrically insulated threaded connection 400 may include a conductive box 410 with a plurality of internal threads 412, a conductive pin 420 with a plurality of external threads 422, and a double-threaded electrical insulator sleeve 415 disposed between conductive box 410 and conductive pin 420. Electrical insulator sleeve 415 may include a plurality of external threads 417 that mate with the plurality of internal threads 412 of conductive box 410 and a plurality of internal threads 419 that mate with the plurality of external threads 422 of conductive pin 420. In certain embodiments, electrical insulator sleeve 415 may uniformly fill a full volume between the plurality of internal threads 412 of conductive box 410 and the plurality of external threads 422 of conductive pin 420, such that there are no voids or pockets between any of the mating threads when joined together. With respect to the threads noted above, "internal" threads refer to threads where the protruding portions, or teeth, are generally directed toward longitudinal axis 402 of threaded connection 400. Similarly, "external" threads refer to threads where the protruding portions, or teeth, are generally directed away from longitudinal axis 402 of threaded connection 400.

In operative use, electrical insulator sleeve 415 (as well as non-conductive shoulder rings 430a and 430b) electrically isolates conductive box 410 from conductive pin 420, forming a non-conductive gap, such that there is no electrical continuity between conductive box 410 and conductive pin 420. In certain embodiments, electrical insulator 415 may be applied as a coating that is applied, or bonded, to threads of conductive box 410 or conductive pin 420. In other embodiments, electrical insulator 415 may be pre-formed by extrusion, injection molding, or other fabrication method. In certain embodiments, electrical insulator sleeve 415 may be composed of polyetheretherketone ("PEEK"), polyphenylensulfide ("PPS"), polybenzimidazole, polyimide, polyamide, or combinations thereof. In other embodiments, electrical insulator sleeve 415 may be composed of other thermoplastic material, thermoset material, or any combinations thereof. Notwithstanding, one of ordinary skill in the art, having the benefit of this disclosure, will recognize that other insulator materials, or combinations thereof, that function as an electrical insulator that prevents the flow of electrical current and meets mechanical requirements may be used in accordance with one or more embodiments of the present invention.

Threaded connection 400 is representative of a flush-style shouldered connection that is commonly used in the oil and gas industry. As such, conductive box 410, electrical insulator sleeve 415, and conductive pin 420 may include connection ends that are tapered. Notwithstanding, one of ordinary skill in the art, having the benefit of this disclosure, will recognize that a threaded connection may take on other shapes for use with standard API thread forms or custom thread forms in accordance with one or more embodiments of the present invention.

Figure 5A:
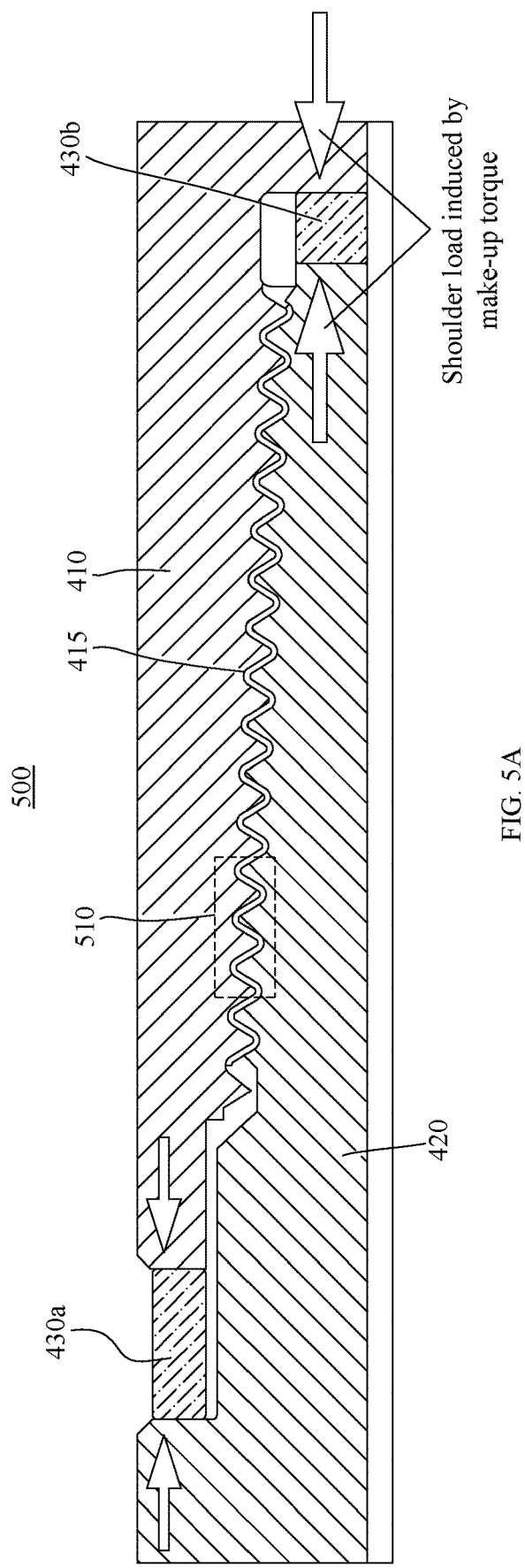
FIG. 5A shows a cross-sectional view of an exemplary electrically insulated threaded connection with a double-threaded electrical insulator sleeve in a double-shoulder configuration in accordance with one or more embodiments of the present invention.

FIG. 5A shows a cross-sectional view 500 of an exemplary electrically insulated threaded connection 400 with a double-threaded electrical insulator sleeve 415 in a double-shouldered 430a, 430b configuration in accordance with one or more embodiments of the present invention.

In shouldered connections, the connection is tightened on the shoulder(s) rather than the threads themselves. These types of connections are typically referred to as rotary shouldered connections ("RSC"). To seal an RSC threaded connection, there is metal-to-metal contact at the shoulders, such that the correct make-up torque is required to make the connection. Standard API-based RSC-type threaded connections typically include a single torque shoulder ("SSC"). Premium API-based RSC-type threaded connections may include two shoulders and are sometimes referred to as double-shouldered connections ("DSC"). Connecting, or making up the connection, and disconnecting, or breaking out the connection, between components of a premium API-based DSC-type threaded connection requires higher torque than a standard API-based SSC-type threaded connection. The shoulders serve as abutments during the make-up of the coupling.

In one or more embodiments of the present invention, an electrically insulated threaded connection may use a new unique thread form disclosed herein that is not a standard API-based thread form or a premium API-based thread form. As discussed in more detail herein, this new unique thread form may provide improved torsional strength for non-API DSC-type threaded connections. Notwithstanding, it may also be used in non-API SSC-type threaded connections and no-shoulder ("NSC") type threaded connections as well. While the new unique thread form disclosed herein is exemplary, one of ordinary skill in the art will recognize that the claimed invention is not so limited and may be applied to other thread forms, including industry standard thread forms, in accordance with one or more embodiments of the present invention.

Continuing, FIG. 5B shows a cross-sectional detail view 510 of exemplary the electrically insulated threaded connection 400 with double-threaded electrical insulator sleeve 415 showing improved interleaving in accordance with one or more embodiments of the present invention.

As previously discussed, the load is transmitted between adjacent thread flanks through the electrical insulator sleeve 415. Only those portions of the metal threads that are interleaved (e.g., 450) will effectively transmit the load. Here, the disclosed thread form maximizes interleaving, such that the interleaved height, D2, is substantially more than, for example, D1 of FIG. 3. Conductive box 410 and conductive pin 420 are designed such that there may be a constant gap between mating threads, where electrical insulator sleeve 415 may be disposed. Electrical insulator sleeve 415 may have a thickness that is at least slightly greater than the gap between conductive box 410 and conductive pin 420 when connected, such that a made-up connection 400 provides an interference fit between conductive box 410, electrical insulator sleeve 415, and conductive pin 420. The interference fit allows uniform compressive loads to be applied to electrical insulator sleeve 415. As conductive box 420 and conductive pin 410 are threaded together, the interference fit provides additional make-up torque before the external shoulder (430a of FIG. 5A) makes contact.

The constant gap between conductive box 410 and conductive pin 420, the matching thread profile between the plurality of internal threads (e.g., 412 of FIG. 4) of conductive box 410 and the plurality of external threads (e.g., 417 of FIG. 4) of electrical insulator sleeve 415 and the matching thread profile between the plurality of external threads (e.g., 422 of FIG. 4) of conductive pin 420 and the plurality of internal threads (e.g., 419 of FIG. 4) of electrical insulator sleeve 415, ensures there are no voids or pockets (e.g., 360, 370 of FIG. 3B). Voids or pockets are areas within a mated thread form where there are no constituent members, just a voided space, that typically results in reduced interleaving. The lack of voids or pockets is also helpful in that the insulator material will act as bulk resistance to compression instead of local yielding, allowing higher make-up torques. Advantageously, electrical insulator sleeve 415 may have a shape that uniformly fills the full volume between the mating threads with an interference fit. As such, in some applications or designs, the make-up torque may be controlled by adjusting the amount of nominal interference in the connection, along with the length of the connection and the strength of the chosen electrical insulator materials.

While conventional threads include voids or pockets, interleaving is typically measured as interleaved height, such as, for example, as shown in FIG. 3B, where the interleaved height is the distance between parallel lines drawn through the crests of engaged thread forms. Here, the unique thread form disclosed, with constant gap, interference fit, and no voids are pockets, enables a new measurement of interleaved area. In one or more embodiments of the present invention, an interleaved height of internal threads of the conductive box and the external threads of the conductive pin may be maximized. Further, an interleaved area of the internal threads of the conductive box and the external threads of the conductive pin may be maximized.

Figure 5C:
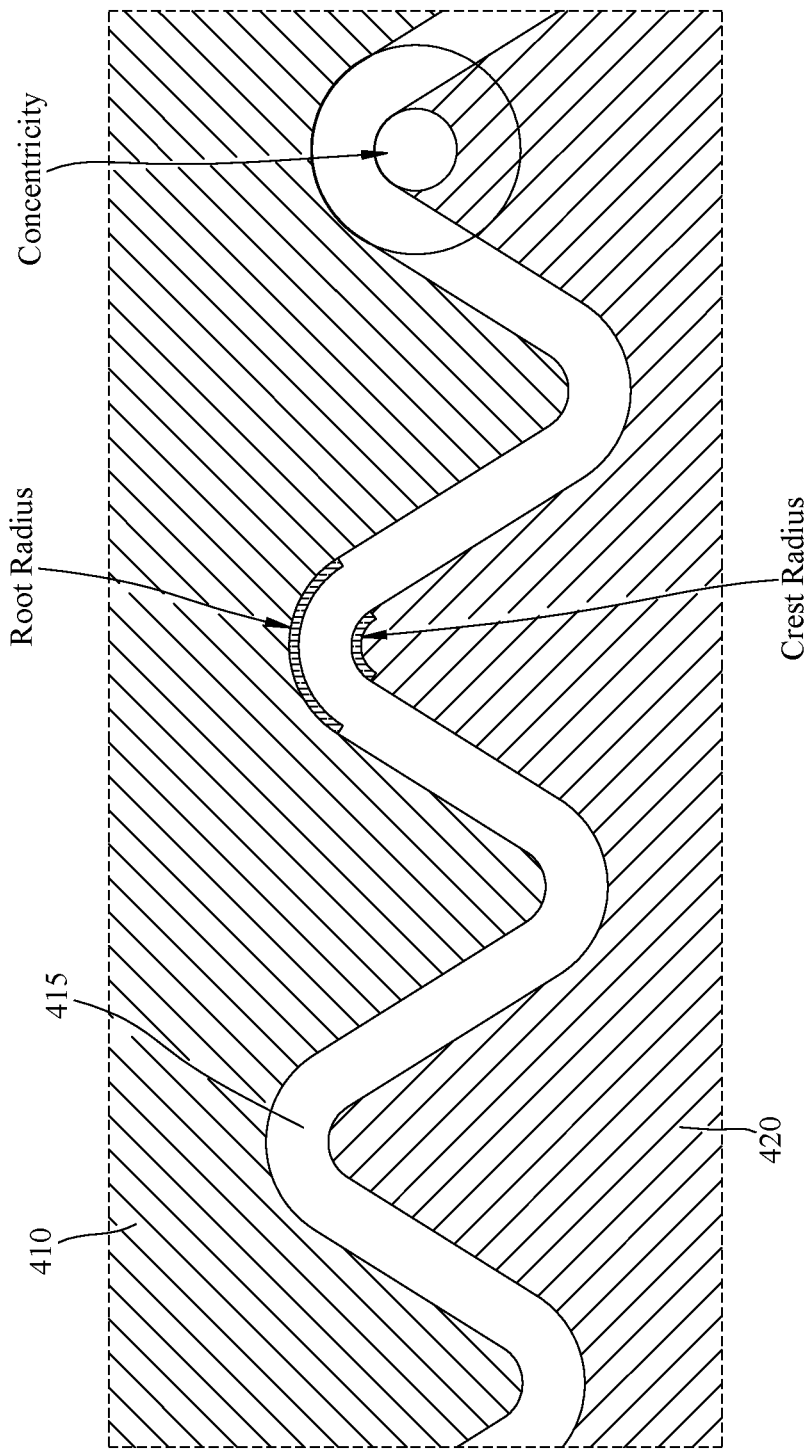
FIG. 5C shows a cross-sectional detail view of the exemplary electrically insulated threaded connection with double-threaded electrical insulator sleeve showing a concentric root and crest embodiment in accordance with one or more embodiments of the present invention.

Continuing, FIG. 5C shows a cross-sectional detail view 520 of the exemplary electrically insulated threaded connection 400 with double-threaded electrical insulator sleeve 415 showing a concentric root and crest radii embodiment in accordance with one or more embodiments of the present invention. As previously discussed, threaded connection 400 is merely exemplary and other thread forms may be used in accordance with one or more embodiments of the present invention.

The load is transmitted between adjacent thread flanks through the electrical insulator 415 and only those portions where the metal threads of conductive box 410 and conductive pin 420 are interleaved will effectively transmit the load. The thread form disclosed herein maximizes the interleaved area which has the added benefit of reducing stress on the flanks by spreading the force out over a larger area. In one or more embodiments of the present invention the disclosed thread form uses concentric root and crest radii that maximize interleaving of the metal threads, maximize the thread root radius (which minimizes the thread root stress concentration), and allows for the use of an electrical insulator sleeve 415 that has an approximately constant thickness that eliminates voids or pockets.

It is desirable to enable make-up torques that are near the limit of what the thread design can withstand, to maximize fatigue life and allow for higher drilling torques. The load is transmitted between adjacent thread flanks through the insulator; however, the metal alloys have significantly higher strength than the thermoplastic of the insulator and the contact forces between thread flanks generate stresses that would exceed the mechanical strength of the insulator. Removing all of the voids or pockets from the thread form allows the insulator to resist these forces hydrostatically, rather than relying on its limited shear and tensile strength. In material science terms, the effect would be described as minimizing the deviatoric component of the stress tensor by balancing the shear stresses, thereby increasing the hydrostatic component of the stress tensor. Material failure theory suggests that, for ductile materials, failure is entirely governed by the deviatoric, so optimizing the construction of the insulator to minimize the deviatoric component offers the opportunity to resist greater loads. To enable the hydrostatic stress state, the thread form is designed to have few or no voids or pockets upon assembly. With the exception that, the ends of the insulator may be left unconstrained for manufacturing convenience. While this compromises the strength of the electrical insulator sleeve 415 locally at the ends, the loads redistribute to the inner teeth.

In one or more embodiments of the present invention, the root radius of conductive box 410 and the crest radius of conductive pin 420 may be concentric. Specifically, the root radius of an internal thread of conductive box 410 may be formed by an arc, such as for example, the arc labeled Root Radius, of a circle that shares a center with a concentric circle, where the crest radius of an external thread of conductive pin 420 may be formed by an arc, such as for example, the arc labeled Crest Radius, of the concentric circle. When applied to the threaded connection 500, each internal thread of conductive box 410 and each corresponding external thread of conductive pin 420 may include concentrically-radiused thread forms, where a root radius of the internal thread is an arc of a circle that shares a center with a concentric circle, where the crest radius of the external thread is an arc of the concentric circle, that maximizes the interleaved area.

In one or more embodiments of the present invention, a thickness of the gap, intended to be filled by electrical insulator sleeve 415, may be determined as the difference between the root radius and the crest radius. In such an embodiment, a thickness of electrical insulator sleeve 415 may be slightly larger than the thickness of the gap to ensure an interference fit.

In one or more embodiments of the present invention, if the intent is to create a gap of constant thickness along the entire thread profile, the crest radius may be selected to be equal to the electrical insulator sleeve 415 thickness or half of the root radius. In such an embodiment, a thickness of electrical insulator sleeve 415 may be slightly larger than the thickness of the gap to ensure an interference fit.

Figure 6A:
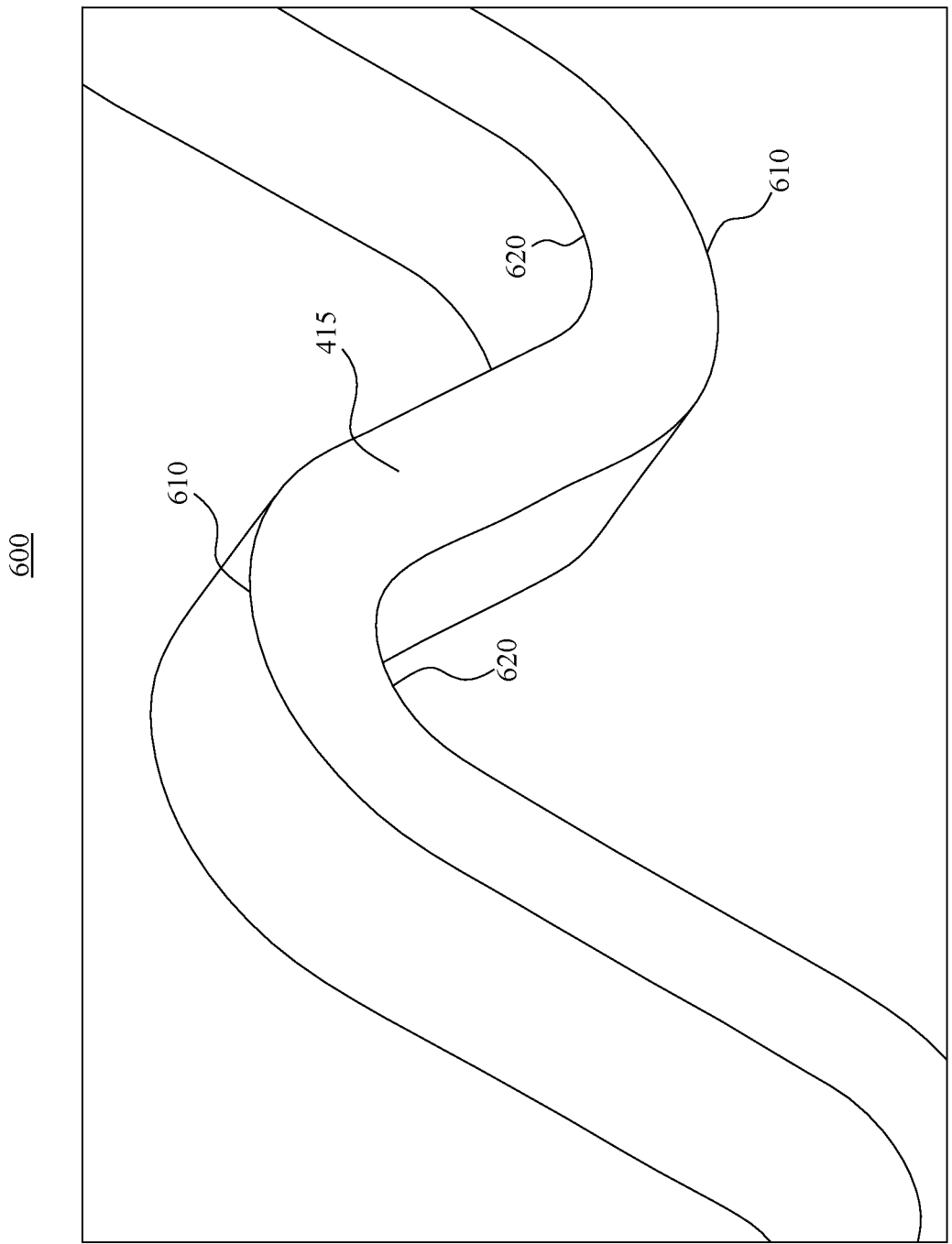
FIG. 6A shows a detail perspective view of a portion of an exemplary double-threaded electrical insulator sleeve showing torque capacity as a function of contact pressure in accordance with one or more embodiments of the present invention.

FIG. 6A shows a detail perspective view of a portion of an exemplary double-threaded electrical insulator sleeve 415 showing torque capacity as a function of contact pressure in accordance with one or more embodiments of the present invention.

Mechanical assemblies are often designed with deliberate interference between mating parts so that they must be forcibly assembled (or assembled by using thermal expansion/contraction of the mating parts). A tapered thread can be designed to radially interfere by allowing full flank contact between the conductive box and the conductive pin before shoulder contact. Adding additional make-up torque to an interfering connection will induce forces that tend to collapse the pin and expand the box. These forces react against each other at the thread interface, and by considering the magnitude of this reaction force, and the radius it is acting at, an effective torque resistance can be determined.

Here, the void-free nature of the threaded connection works synergistically with the radial interference. The load distribution from radial interference is much more even than the load distribution from shoulder loads. Consequently, the interference loads induce very little deviatoric stress within the threaded insulator and thus the radial interference is able to contribute very significant torque capacity to the assembly, without compromising the threaded insulator. In experiment, there are benefits from radial interference up to 2% with typical values in the range of 0.1% to 0.15% for drill string components (e.g., gab sub) and up to 0.05% for other components (e.g., probe-based components).

Figure 6B:
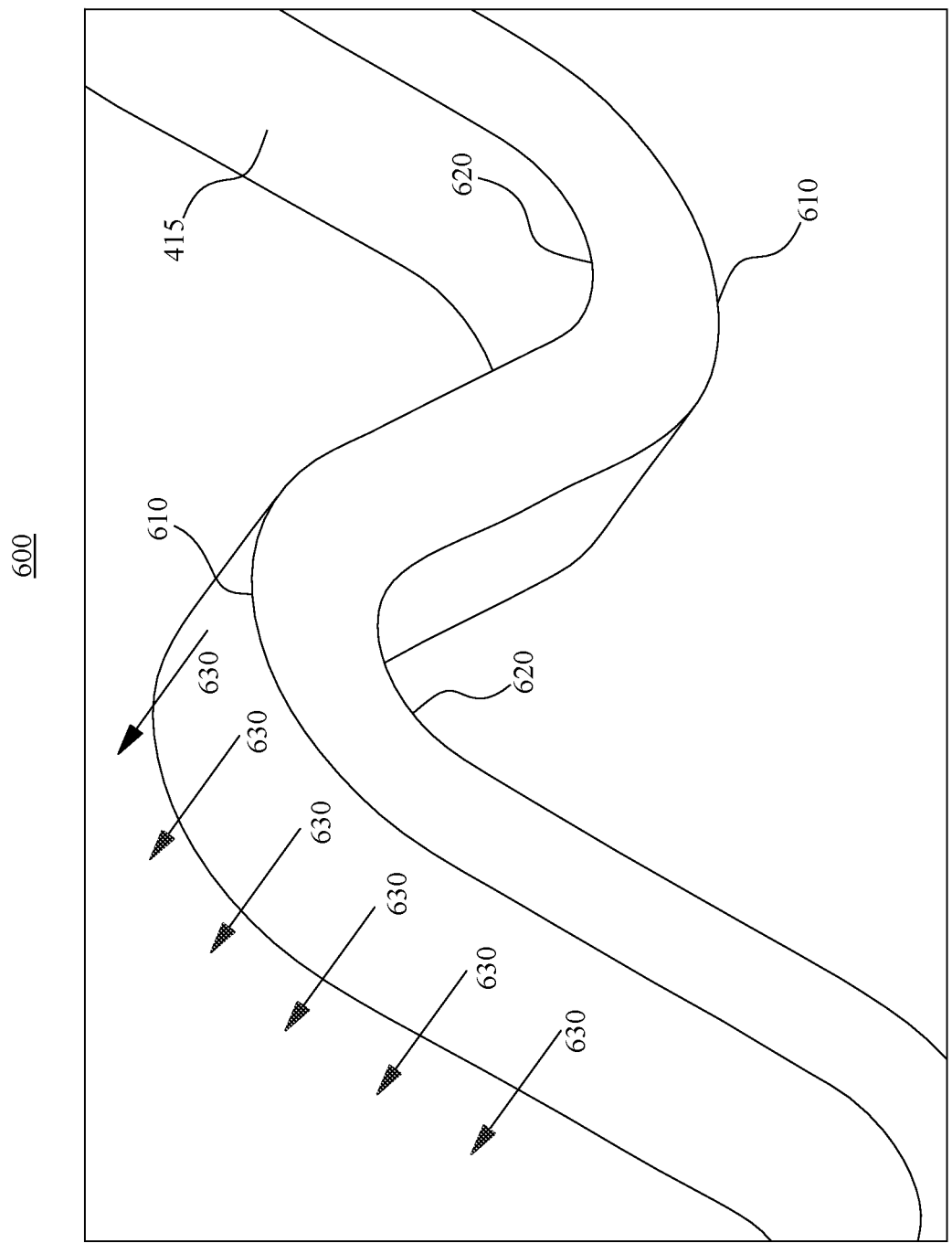
FIG. 6B shows a detail perspective view of a portion of an exemplary double-threaded electrical insulator sleeve showing circumferential torque force components in accordance with one or more embodiments of the present invention.

Continuing, FIG. 6B shows a detail perspective view of a portion of an exemplary double-threaded electrical insulator sleeve 415 showing contact pressures in accordance with one or more embodiments of the present invention.

During assembly, the double-threaded electrical insulator sleeve 415 is subjected to considerable circumferential (rotational) force. This force arises from the friction between the threaded insulator and the adjacent components. Variations in thread interference, as well as load biasing caused by shoulder engagement, result in load distribution that varies along the length of the thread. If this load varies too quickly, it will impart shear forces on the threaded insulator which could ultimately cause the threaded electrical insulator 415 to tear. To minimize the shear forces, it is desirable to have an interface with a relatively low coefficient of friction, which reduces sensitivity to changes in contact pressure. Electrical insulator sleeve 415 should have an interface coefficient of friction to the adjacent components of less than 0.3. This may be achieved by careful selection of the insulator material, or by use of a lubricant, such as a non-conductive pipe dope or a curing thread compound such as LocTite©.

Lower contact pressures on the stab flank result in relatively low circumferential friction force during make-up.

High contact pressures 630 are generated on the load flank, resulting in high circumferential friction force during make-up. The change in force along the profile from the stab to the load flank means that a shear stress is present. If the shear stress exceeds the shear strength of the electrical insulator sleeve 415, it will tear. Minimizing the coefficient of friction on the interface reduces the magnitude of change of the circumferential force component. This reduces the shear stress experienced by the electrical insulator sleeve 415.

Figure 7A:
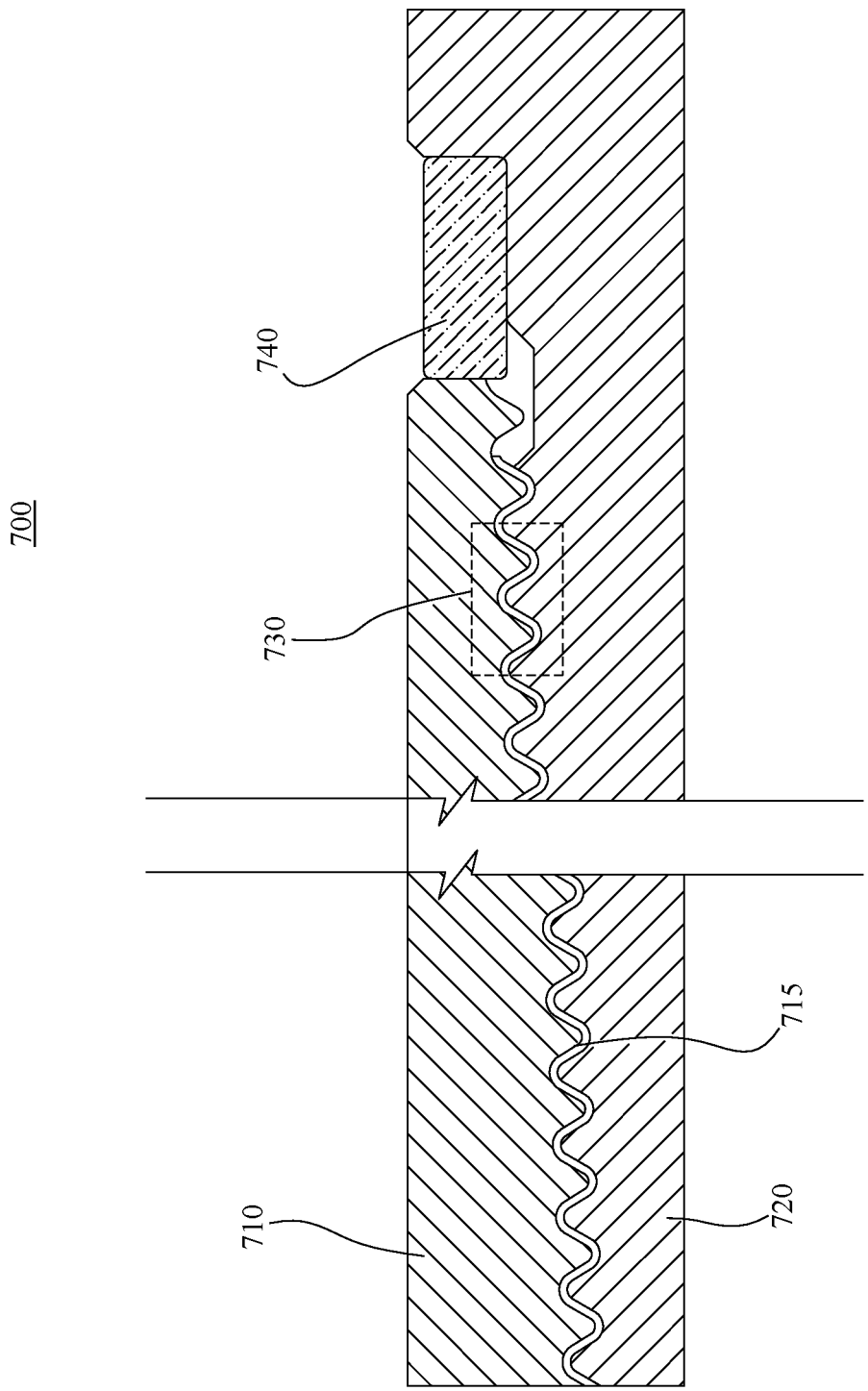
FIG. 7A shows an exemplary electrically insulated threaded connection with double-threaded electrical insulator sleeve showing additional interference in accordance with one or more embodiments of the present invention.

FIG. 7A shows an exemplary electrically insulated threaded connection 700 with double-threaded insulator sleeve 715 showing additional interference in accordance with one or more embodiments of the present invention.

Figure 7B:
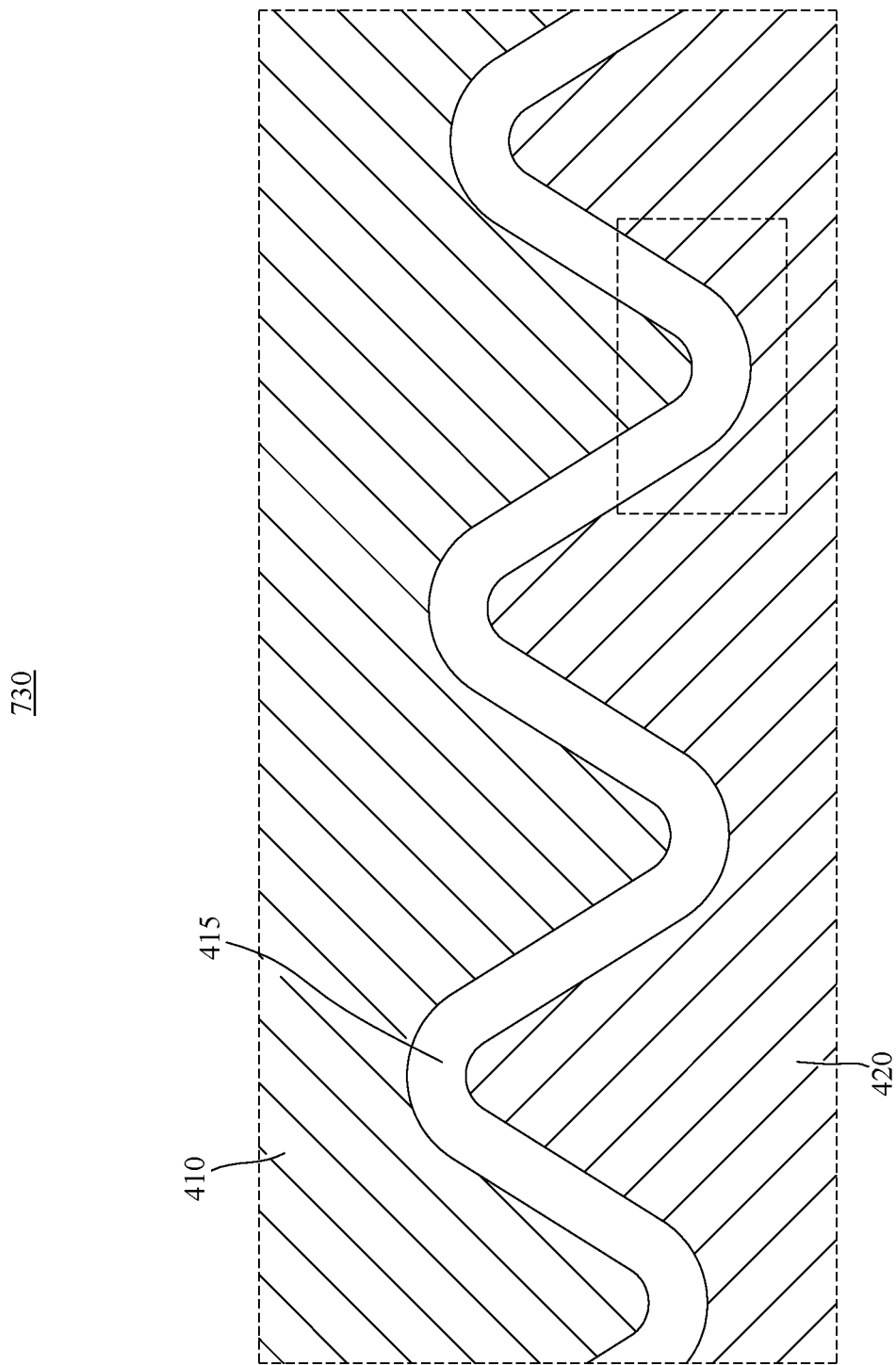
FIG. 7B shows a detail view of a section of an exemplary electrically insulated threaded connection with double threaded electrical insulator sleeve showing interference between the insulator and the metal threads in accordance with one or more embodiments of the present invention.

Continuing, FIG. 7B shows a detail view of an electrically insulated threaded connection with double threaded electrical insulator sleeve showing interference between the insulator and the metal threads in accordance with one or more embodiments of the present invention.

Figure 7C:
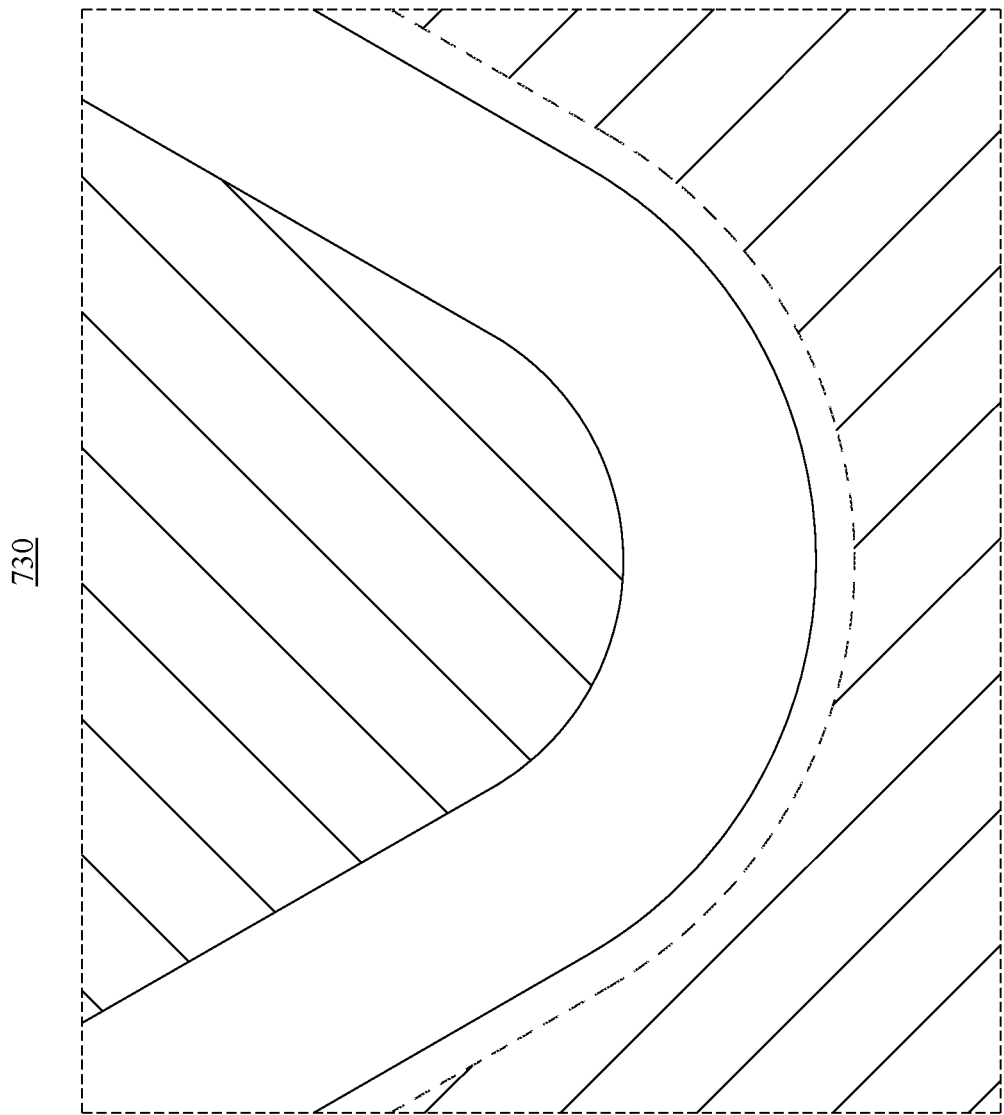
FIG. 7C shows a further detail view of a section of an exemplary electrically insulated threaded connection with double threaded electrical insulator sleeve showing interference between the insulator and the metal threads in accordance with one or more embodiments of the present invention.

Continuing, FIG. 7C shows a further detail view of an electrically insulated threaded connection with double threaded electrical insulator sleeve showing interference between the insulator and the metal threads in accordance with one or more embodiments of the present invention.

Figure 8:
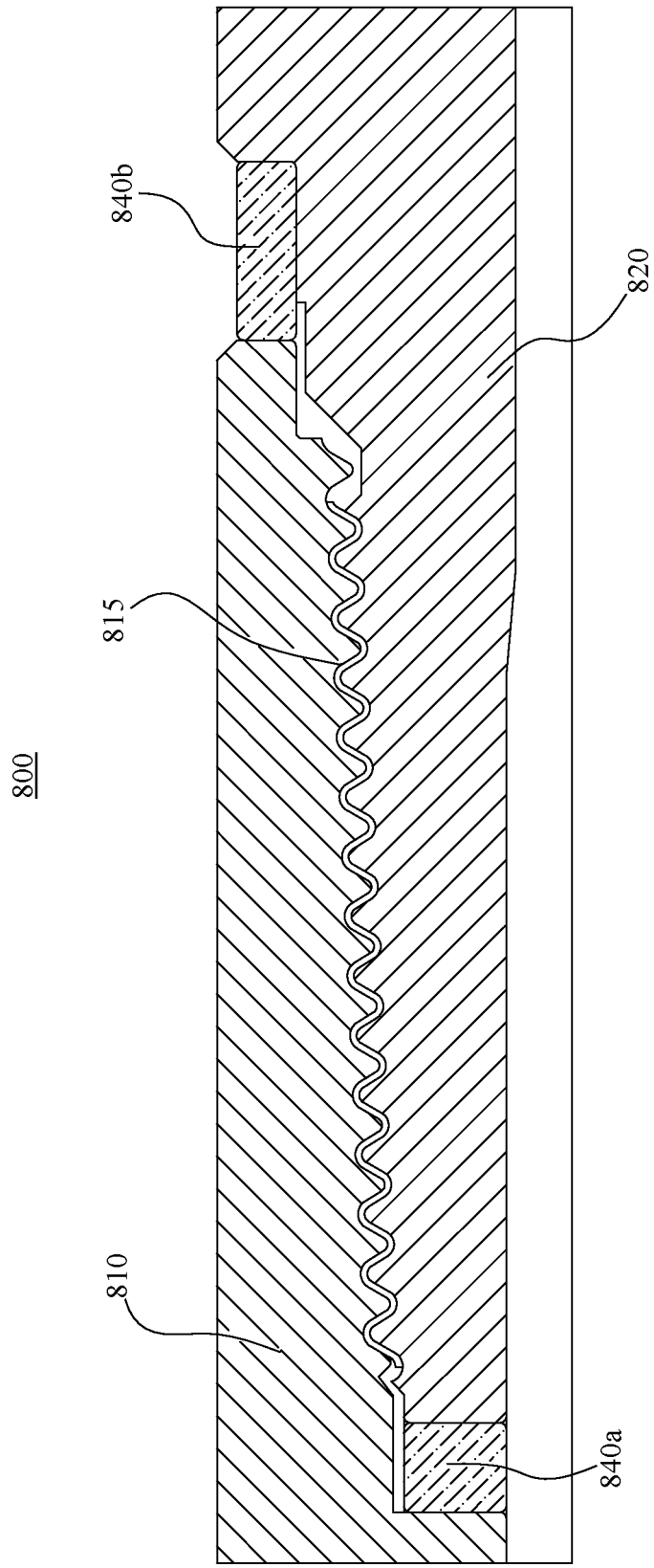
FIG. 8 shows an exemplary electrically insulated threaded connection with double-threaded electrical insulator sleeve in a double-shouldered configuration in accordance with one or more embodiments of the present invention.

FIG. 8 shows an exemplary electrically insulated threaded connection 800 with double-threaded electrical insulator sleeve 815 in a double-shouldered 840a, 840b configuration in accordance with one or more embodiments of the present invention.

In addition to the torque gained from the interfering electrical insulator sleeve 815, a pair of internal 840a and external 840b shoulder rings are loaded to obtain a combined make-up torque. As is known in the field, the addition of the secondary internal shouldering element allows for much higher make-up torque to be achieved. Once the internal shoulder is engaged, the conductive pin 820 is no longer under tensile force through the length of conductive pin 820. Conductive pin 820 experiences a compressive force originating at the nose and extending back towards the external shoulder and helps balancing/reduce the stresses on pin 820. The reduced stresses therefore allow higher torques to be applied to the connection. One disadvantage of the double shouldered connection is the need to have very tight tolerance on the length of the conductive pin and the box shoulder-to-shoulder distance.

Figure 9:
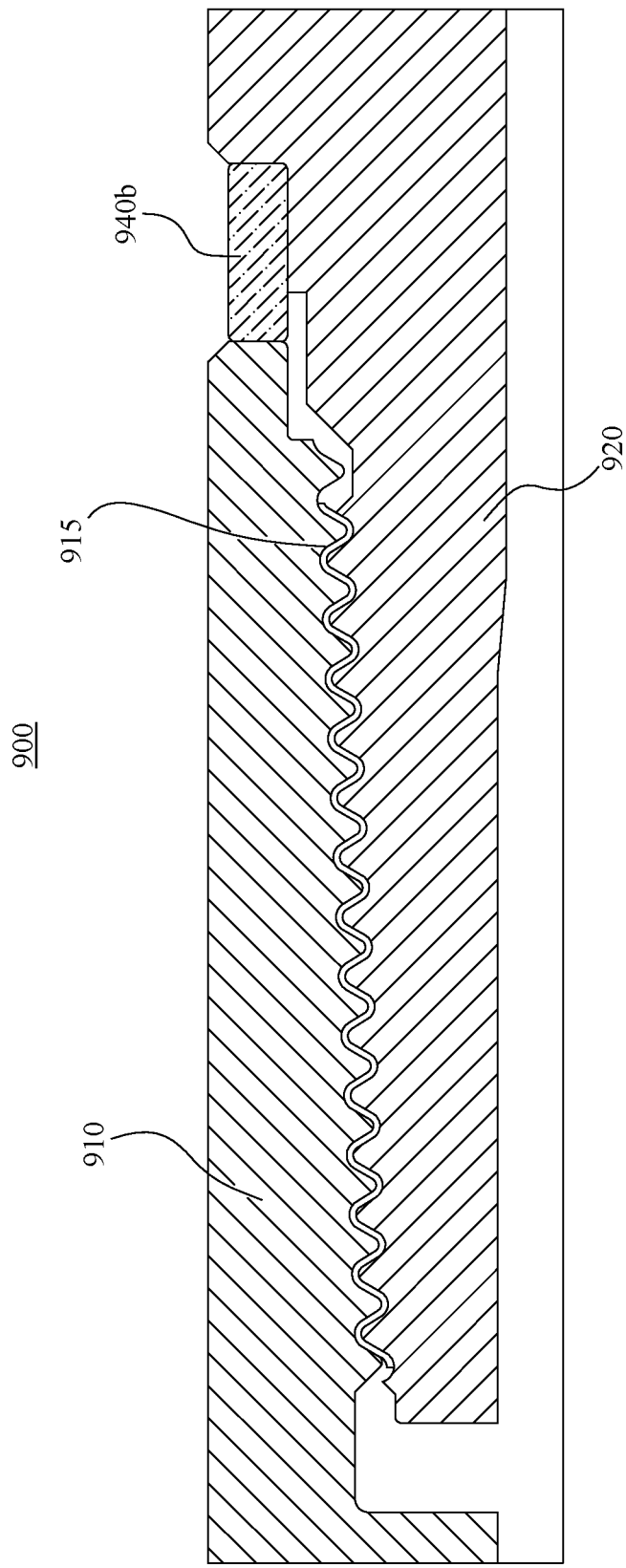
FIG. 9 shows an exemplary electrically insulated threaded connection with double-threaded electrical insulator sleeve in a single-shouldered configuration in accordance with one or more embodiments of the present invention.

FIG. 9 shows an exemplary electrically insulated threaded connection 900 with double-threaded electrical insulator sleeve 915 in a single-shouldered 940b configuration in accordance with one or more embodiments of the present invention.

The addition of the external shoulder ring 940b allows torque to be applied to the connection using both interfering insulator torque and traditional shoulder torque. The single-shouldered connection does not allow as high of a make-up torque as the double-shouldered does, however, it has the advantage of lower manufacturing cost due to the dimensional tolerances being looser.

Figure 10:
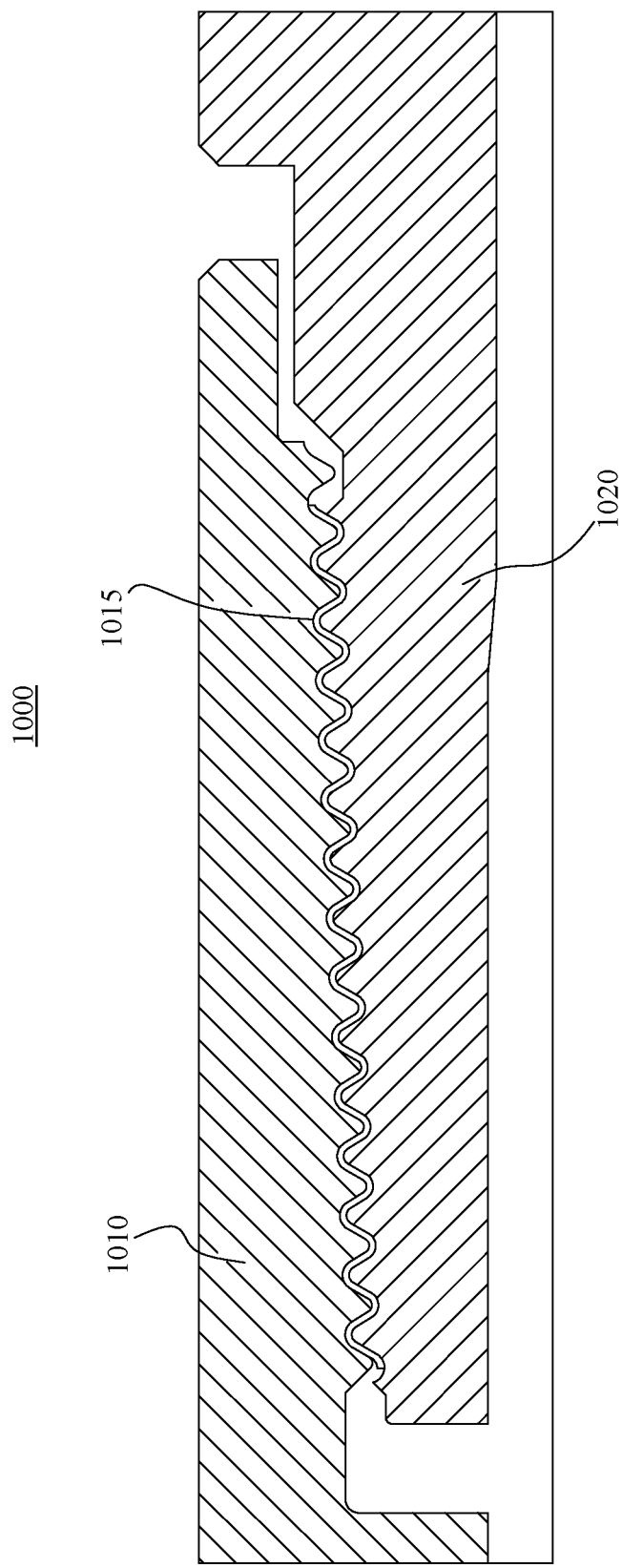
FIG. 10 shows an exemplary electrically insulated threaded connection with double-threaded electrical insulator sleeve in a no-shoulder configuration in accordance with one or more embodiments of the present invention.

FIG. 10 shows an exemplary electrically insulated threaded connection 1000 with double-threaded electrical insulator sleeve 1015 in a no-shoulder configuration in accordance with one or more embodiments of the present invention.

The make-up torque is composed entirely by the interfering connection. One major benefit of this approach is that the connection can continue to be torqued until the desired make-up torque is achieved. There is no longer a need for tight-tolerance machining of the pin and box subs, as long as the taper angle and thread forms are shared throughout the mating pieces. One disadvantage of this no-shoulder approach is the potential degradation of performance under large bending forces (dog legs). With the shoulders removed, the bending stresses are applied throughout the connection itself, instead of the shoulders.

Advantages of one or more embodiments of the present invention may include one or more of the following:

In one or more embodiments of the present invention, an electrically insulated threaded connection provides a robust threaded connection that provides electrical isolation, maintains structural integrity, and provides increased make-up torque capability.

In one or more embodiments of the present invention, an electrically insulated threaded connection includes three components, a conductive pin with a plurality of external threads, a conductive box with a plurality of internal threads, and a double-threaded electrical insulator sleeve that includes a plurality of external threads that mate with the plurality of internal threads of the conductive box and a plurality of internal threads that mate with the plurality of external threads of the conductive pin.

In one or more embodiments of the present invention, an electrically insulated threaded connection includes a double-threaded electrical insulator sleeve that fills the entire volume between the metal threads of the pin and the box and there are no voids or pockets between the metal threads of the pin and the box when made up. As such, there is nowhere for the sleeve to deform into under load (via the Poisson effect). The insulator sleeve cannot readily change shape and better resists loading. The insulator sleeve fills the full volume between the metal threads of the pin and the box and can be considered as being under hydrostatic compression, which causes a volume change of the insulator sleeve but does not cause it to yield or fail. In certain embodiments, the even distribution of pressure on the insulator sleeve in all directions provides extra torque resistance and additional mechanical strength for the entire threaded connection.

In one or more embodiments of the present invention, an electrically insulated threaded connection includes a double-threaded electrical insulator sleeve in which the contact pressures on all faces of the insulator sleeve and its resistance to changing volume imparts pressure loading on the male and female threaded sections that cause axial displacement of both bodies, which further increases the torque on the joint. This ensures that the insulator sleeve can withstand a much higher load, which better utilizes the strength of the insulator sleeve and allows the threaded connection to have a much higher torque capacity.

In one or more embodiments of the present invention, an electrically insulated threaded connection provides additional interference between the plurality of external threads of the double-threaded electrical insulator sleeve and the mating plurality of internal threads of the box and between the plurality of internal threads of the insulator sleeve and the mating plurality of external threads of the pin. The threads start to interfere before the corresponding shoulders of the pin and the box contact each other.

In one or more embodiments of the present invention, an electrically insulated threaded connection provides more evenly distributed stress, which increases make-up and break-out torque capability of the entire threaded connection.

In one or more embodiments of the present invention, an electrically insulated threaded connection includes a double-threaded electrical insulator sleeve that is a serviceable component that may be easily removed and replaced if necessary.

In one or more embodiments of the present invention, an electrically insulated threaded connection includes a double-threaded electrical insulator that may be injected at sufficiently high pressure as to expand the pin and box away from each other. Once the injected material is cured and the pressure is released, a similar interference connection may be established.

In one or more embodiments of the present invention, an electrically insulated threaded connection includes a double-threaded electrical insulator that does not require the use of adhesives or thread lockers and is easier to break the connection if needed.

In one or more embodiments of the present invention, an electrically insulated threaded connection reduces the manufacturing and maintenance costs of an electrically insulated threaded connection.

In one or more embodiments of the present invention, an electrically insulated threaded connection may be used as a gap sub, a gap joint where the insulation is required for internal components (e.g., probe-based EM telemetry), or any other application that requires electrical isolation between mating tubular members.

While the present invention has been described with respect to the above-noted embodiments, those skilled in the art, having the benefit of this disclosure, will recognize that other embodiments may be devised that are within the scope of the invention as disclosed herein.

The invention claimed is:

1. An electrical insulated threaded connection comprising:
a conductive box with a plurality of internal threads;
a conductive pin with a plurality of external threads;
a double-threaded electrical insulator sleeve disposed between the conductive pin and box,
wherein the double-threaded electrical insulator sleeve comprises a plurality of external threads that mate with the plurality of internal threads of the conductive box and a plurality of internal threads that mate with the plurality of external threads of the conductive pin,
wherein the double-threaded electrical insulator sleeve fills a full volume between the plurality of internal threads of the conductive box and the plurality of external threads of the conductive pin, and
wherein there are no voids or pockets between any of the mating threads.

2. The electrically insulated threaded connection of claim 1, wherein each internal thread of the conductive box and each corresponding external thread of the conductive pin comprise a concentrically-radiused thread form, wherein a root radius of the internal thread is an arc of a circle that shares a center with a concentric circle, and wherein the crest radius of the external thread is an arc of the concentric circle, that maximize the interleaved area.

3. The electrically insulated threaded connection of claim 2, wherein a difference between a root radius of an internal thread and a corresponding crest radius of an external thread is equal to a thickness of the double-threaded electrical insulator sleeve at that location.

4. The electrically insulated threaded connection of claim 2, wherein a thickness of the double-threaded electrical insulator sleeve is approximately equal to the crest radius or one-half of the root radius.

5. The electrically insulated threaded connection of claim 1, wherein an interleaved height of internal threads of the conductive box and the external threads of the conductive pin is maximized.

6. The electrically insulated threaded connection of claim 1, wherein an interleaved area of the internal threads of the conductive box and the external threads of the conductive pin is maximized.

7. The electrically insulated threaded connection of claim 1, wherein the plurality of external threads of the double-threaded electrical insulator sleeve starts to interfere with the plurality of internal threads of the conductive box before corresponding shoulders of the conductive pin and the conductive box make contact.

8. The electrically insulated threaded connection of claim 1, wherein double-threaded electrical insulator is composed of polyetheretherketone, polyphenylensulfide, polybenzimidazole, polyimide, polyamide and other thermoplastic or thermoset materials, or combinations thereof.

9. The electrically insulated threaded connection of claim 1, wherein the threaded connection is a no-shouldered connection.

10. The electrically insulated threaded connection of claim 1, wherein the threaded connection is a single-shouldered connection.

11. The electrically insulated threaded connection of claim 1, wherein the threaded connection is a double-shouldered connection.

12. An electrical insulated threaded connection comprising:
a conductive box with a plurality of internal threads;
a conductive pin with a plurality of external threads;
a double-threaded electrical insulator sleeve disposed between the conductive pin and box,
wherein the double-threaded electrical insulator sleeve comprises a plurality of external threads that mate with the plurality of internal threads of the conductive box and a plurality of internal threads that mate with the plurality of external threads of the conductive pin,
wherein the plurality of external threads of the double-threaded electrical insulator sleeve starts to interfere with the plurality of internal threads of the conductive box before corresponding shoulders of the conductive pin and the conductive box make contact.

13. The electrically insulated threaded connection of claim 12, wherein each internal thread of the conductive box and each corresponding external thread of the conductive pin comprise a concentrically-radiused thread form, wherein a root radius of the internal thread is an arc of a circle that shares a center with a concentric circle, and wherein the crest radius of the external thread is an arc of the concentric circle, that maximize the interleaved area.

14. The electrically insulated threaded connection of claim 13, wherein a difference between a root radius of an internal thread and a corresponding crest radius of an external thread is equal to a thickness of the double-threaded electrical insulator sleeve at that location.

15. The electrically insulated threaded connection of claim 13, wherein a thickness of the double-threaded electrical insulator sleeve is approximately equal to the crest radius or one-half of the root radius.

16. The electrically insulated threaded connection of claim 12, wherein an interleaved height of internal threads of the conductive box and the external threads of the conductive pin is maximized.

17. The electrically insulated threaded connection of claim 12, wherein an interleaved area of the internal threads of the conductive box and the external threads of the conductive pin is maximized.

18. The electrically insulated threaded connection of claim 12, wherein the double-threaded electrical insulator sleeve fills a full volume between the plurality of internal threads of the conductive box and the plurality of external threads of the conductive pin, and wherein there are no voids or pockets between any of the mating threads.

19. The electrically insulated threaded connection of claim 12, wherein double-threaded electrical insulator is composed of polyetheretherketone, polyphenylensulfide, polybenzimidazole, polyimide, polyamide and other thermoplastic or thermoset materials, or combinations thereof.

20. The electrically insulated threaded connection of claim 12, wherein the threaded connection is a no-shouldered connection.

21. The electrically insulated threaded connection of claim 12, wherein the threaded connection is a single-shouldered connection.

22. The electrically insulated threaded connection of claim 12, wherein the threaded connection is a double-shouldered connection.

23. A double-threaded electrical insulator sleeve comprising:
a plurality of external threads having a thread form that mates with a plurality of internal threads of a conductive box, and
a plurality of internal threads having a thread form that mates with a plurality of external threads of a conductive pin,
wherein the double-threaded electrical insulator sleeve disposed between the conductive pin and box, and
wherein the double-threaded electrical insulator sleeve fills a full volume between the plurality of internal threads of the conductive box and the plurality of external threads of the conductive pin, and
wherein there are no voids or pockets between any of the mating threads.

24. The double-threaded electrical insulator of claim 23, wherein a crest-facing radius and a root-facing radius of each thread are concentrically-radiused, wherein the crest-facing radius is an arc of a circle that shares a center with a concentric circle, and wherein a root-facing radius is an arc of the concentric circle.

25. The double-threaded electrical insulator of claim 24, wherein a difference in radius between the root-facing radius and the crest-facing radius is substantially equal to a thickness of the electrical insulator material at that location.

26. The double-threaded electrical insulator sleeve of claim 23, wherein the double-thread electrical insulator sleeve is fabricated by an injection molding process.

27. The double-threaded electrical insulator sleeve of claim 23, wherein the electrical insulator material is composed of polyetheretherketone, polyphenylensulfide, polybenzimidazole, polyimide, polyamide, and other thermoplastic or thermoset materials, or combinations thereof.

* * * * *